(12) United States Patent
Ben-Bassat et al.

(10) Patent No.: US 10,852,712 B2
(45) Date of Patent: Dec. 1, 2020

(54) TRACKING PRODUCTION IN A PRODUCTION FACILITY USING SEARCHABLE DIGITAL THREADS

(71) Applicants: Moshe Ben-Bassat, Tzur Moshe (IL); Avner Ben-Bassat, Even Yehuda (IL); Eduard Goldner, Tel Aviv (IL); Naaman Lifshitz, Kiryat Ono (IL); Michal Diga, Petah Tikva (IL); George Kozarev, Sderot (IL)

(72) Inventors: Moshe Ben-Bassat, Tzur Moshe (IL); Avner Ben-Bassat, Even Yehuda (IL); Eduard Goldner, Tel Aviv (IL); Naaman Lifshitz, Kiryat Ono (IL); Michal Diga, Petah Tikva (IL); George Kozarev, Sderot (IL)

(73) Assignee: Plataine Ltd., Petach Tikva (IL)

( * ) Notice: Subject to any disclaimer, the term of this patent is extended or adjusted under 35 U.S.C. 154(b) by 187 days.

(21) Appl. No.: 15/434,069

(22) Filed: Feb. 16, 2017

(65) Prior Publication Data
US 2018/0196409 A1    Jul. 12, 2018

Related U.S. Application Data

(60) Provisional application No. 62/296,106, filed on Feb. 17, 2016.

(51) Int. Cl.
*G05B 19/418* (2006.01)
*G06Q 10/08* (2012.01)
(Continued)

(52) U.S. Cl.
CPC ......... *G05B 19/4183* (2013.01); *G06F 16/23* (2019.01); *G06K 7/10* (2013.01);
(Continued)

(58) Field of Classification Search
CPC ............... G05B 19/4183; G06F 16/23; G06Q 10/06315; G06Q 50/04; G06Q 10/06;
(Continued)

(56) References Cited

U.S. PATENT DOCUMENTS 6,829,520 B1 * 12/2004 Green ..................... G01K 3/04
700/225
2003/0120677 A1 * 6/2003 Vernon .................. G06Q 10/08
(Continued)

FOREIGN PATENT DOCUMENTS

WO     2013/120209      8/2013

*Primary Examiner* — Jigneshkumar C Patel
(74) *Attorney, Agent, or Firm* — Naomi S. Rosenman-Helfand

(57) ABSTRACT

The invention discloses a computer-implemented method for tracking production in a production facility and for obtaining searchable production records. The method comprises providing a production site with communication access to a central server configured to:
a) receive status and location data pertaining to tagged central key assets of said production facility, from tracking readers located in the production facility.
b) record the status and location data in a searchable database of digital threads. The digital threads describe time-related status and information particulars related to production of a manufactured product.
c) allow execution of a search to detect the particulars of the digital threads.

The invention also describes a system for execution of the method.

20 Claims, 6 Drawing Sheets

(51) Int. Cl.
*G06Q 10/06* (2012.01)
*G06F 16/23* (2019.01)
*G06K 7/10* (2006.01)
*G06Q 50/04* (2012.01)

(52) U.S. Cl.
CPC ....... *G06Q 10/06* (2013.01); *G06Q 10/06315* (2013.01); *G06Q 10/0833* (2013.01); *G06Q 50/04* (2013.01); *Y02P 80/40* (2015.11); *Y02P 90/30* (2015.11)

(58) Field of Classification Search
CPC ...... G06Q 10/0833; G06K 7/10; Y02P 80/40; Y02P 90/30
USPC ........................................................ 700/115
See application file for complete search history.

(56) References Cited

U.S. PATENT DOCUMENTS

| | | | | |
|---|---|---|---|---|
| 2007/0198113 | A1* | 8/2007 | Erickson | G05B 19/128 |
| | | | | 700/95 |
| 2008/0103622 | A1* | 5/2008 | Hanses | G05B 19/4183 |
| | | | | 700/116 |
| 2009/0283583 | A1* | 11/2009 | Cowburn | G06Q 10/087 |
| | | | | 235/375 |
| 2010/0250461 | A1 | 9/2010 | Arnold et al. | |
| 2014/0030043 | A1* | 1/2014 | Brown | B42C 7/00 |
| | | | | 412/3 |
| 2016/0110680 | A1* | 4/2016 | Salour | G06Q 10/087 |
| | | | | 235/375 |

\* cited by examiner

Figure 3

TRACKING PRODUCTION IN A PRODUCTION FACILITY USING SEARCHABLE DIGITAL THREADS

FIELD OF THE INVENTION

The invention generally relates to software for overseeing and documenting production, of a production line. The software automatically records the specifics of each product manufactured, as a digital twin, which includes for instance, batch details, personnel and equipment used, temperatures recorded during manufacture, etc. The software presents ideal decisions for the production floor, optimizing the production operation, and creates a digital basis for optimization software. The software aids in backtracking the manufacturing history. The software supports audit-processes in regulated industries. The software is especially useful in complex and quality-demanding or highly regulated industries, such as the aerospace industry, automotive industry, pharmaceutical industry, and power generation industry. A system is disclosed as well.

BACKGROUND

In many manufacturing industries, such as the aerospace industry and the automobile industry, a malfunction in a final component may be discovered during the production process, or during routine periodical checks of the deployed vehicle or airplane.

As many of the final components are complex and include multiple individual subcomponents, which are typically manufactured at more than one location, a manufacturer will typically need to stop shipment or recall far more of the final product (e.g. vehicles) than truly necessary. This occurs as manufacturers typically lack the precise visibility and documentation, and cannot know exactly which specific end-product includes which specific sub-components or specific raw materials. Similarly, there is no way to retroactively detect which end-product was made with specific tools, by a given employee or at given environmental conditions.

If the failure could be traced back to a specific production run, in a specific factory, in which an error occurred or a defective material was utilized, the manufacturer could highly limit the extent of the products which must be corrected, from hundreds of thousands of units, to merely a few hundred units. Limiting the extent of the corrections made, would prevent damage to the manufacturer's reputation, which typically has severe financial ramifications. Further, it would lower the actual cost of replacement of the damaged parts, and would prevent inconveniencing the final end users (e.g. vehicle owners).

Highly regulated industries include the aerospace industry, automotive industry, pharmaceutical industry, and energy and power generation. Even in such industries, to date, tracking a failure back to a specific manufacturing run, in a specific manufacturing plant, requires reviewing countless documents detailing each production run. This typically takes weeks, during which production may continue using the faulty components.

It would be advantageous to automatically record manufacturing details, in a computer-searchable format, which includes the specifics of the individual ingredients used, the tools used, the personnel employed for the run, temperatures measured during the run, etc. Such a detailed electronic record of the manufactured end product is termed a "digital twin", and can be linked with many "digital threads" which lead up to the digital twin. The digital threads of multiple product may also intersect, as—for example—when different products are created from the same material, or by the same tool.

The general concept of recording a digital twin has recently been suggested in some industries.

U.S. Pat. Publication No. 2016/0247129 to Siemens Co., describes creation of a digital twin of machine components such as air-conditioning units, and tracking the need for maintenance, from sensors in the final product, which report back their run-time log.

U.S. Pat. No. 6,804,589 to Honeywell Intl. Inc., describes software for tracking overhaul and maintenance for aerospace products, but not from the time of manufacture, rather from the time of deployment. U.S. Pat. No. 7,925,550 to Oracle Intl. Co., pertains to software for tracking inventory, work orders, and purchases, to the level of batch number, for regulated industries.

However, recording a digital twin has not been used to date to track production in a production line which utilizes raw materials that are time-sensitive and temperature-sensitive materials.

In the aerospace industry, for instance, carbon fiber reinforced polymers (such as CFRP) are typically used as raw material for the main body of the aircraft. Such carbon composite materials (e.g. CFRP) are typically stored in industrial freezers prior to use. Once a unit of material is defrosted for use, it must reach the manufacturing stage of curing within a set time, termed the ETL (exposure time left), or it will deteriorate in quality and be deemed unsafe for use. A large roll or container of material may be defrosted and refrozen several times until it is totally depleted.

The material also has a final expiration date which must be noted as the "use by" date ("cure by" date).

At any given time, a multitude of units of material will be in use on a production floor, with each unit having a different ETL, since the units may originate from various units of "parent" material. Additionally, the units are temperature sensitive, so that the temperature of each unit must be monitored and fluctuations in temperature must be avoided.

It is difficult at present to keep track of the various expiration dates and ETLs of materials on the production floor, and it is not known to record these details in a searchable format for posterity. Additionally, many complex mechanical or electronic components in the final product are manufactured from a plurality of subcomponents, each made at a different facility in a different batch, and each having manufacturing specifics which are not searchable at present.

To date, ETL (Exposure Time Left) and expiration date data of composite raw material, kits, or assemblies, are recorded manually on a 'travel document' that accompanies each asset. In many cases, when a delay occurs in producing a kit due to a missing part or tool, the delay is only reflected on a specific paper form, and for that specific asset. There is no record of the influence on other related assets or in the final product produced. This is true for any inherited property which could be a physical property (max humidity allowed, elasticity) or recommendations for handling central production assets (e.g. the material should be cut and layed up so as to prevent cutting of acute angles).

If a crack is noted during inspection of an airplane wing, it would be desirous to be able to rapidly track back the specific manufacturing run during which the wing was made, to allow only inspection of all wings made on the same date.

If the material is deemed to have been the cause of the failure, it would be desirous to be able to track down any additional wings made from the same batch of material, even if they were manufactured on a different date, during an additional production run.

It is an object of the invention to provide a method and system for tracking and recording the minute details which may influence production, in a production run. The data is saved electronically in a digital twin which includes digital threads, which may be searchable at a later date. In a preferred embodiment of the invention, key assets such as central raw materials entering the facility is tagged with an RFID tag or other sensor, which transmits data related to the status of the material, for storage in a computerized database. The status is sensed and tracked from receipt of the material, until shipment of the final product. These and other objects and advantages will be enlarged upon in the Detailed Description of the Invention herein-below.

While the invention is described below in relation to its use in tracking and documenting manufacture of aircraft components, this is merely a common example, and the software may be utilized to track manufacture of any article in any industry.

SUMMARY OF THE INVENTION

In the present invention, the term "digital twin" refers to an electronic record of a manufactured product, including reference to all manufacturing details which may affect the integrity or efficiency of the final product; these make up a "digital thread" of the product.

Non-limiting examples of the particulars which make up a digital thread include: time-related location particulars during manufacture, the identity of the specific tools used, the environmental conditions, batch details, the detailed particulars of raw ingredients, the identity of the employees that took part in the manufacture, etc.

The term "digital thread" refers to an electronic record of all manufacturing details which may affect the integrity or efficiency of the final product, and includes details which originate from the "parent" raw materials. Thus, the digital thread includes details of the manufacture of the raw materials used for production of a final end product. In a complex product, several digital threads lead up to a "digital twin" (e.g. when several raw materials are used, each of which has its own digital thread, and together the details form the digital twin of the end product).

Non-limiting examples of digital threads include: all products manufactured by a specific tool, or made on a certain date, or by a specific employee.

The digital twin and digital thread are electronically searchable, so that in case of a future need for diagnostic retrieval of information, a search may identify any of the following examples: any products manufactured using a specific material or batch; products made using a specific predefined ingredient or raw material; products made on specific dates; products made using specific tools; products made by a specific employee; products made at specific temperatures; products made at a specific manufacturing facility; products shipped on a specific date, etc. or any combination of the above conditions.

In the present invention, the terms "manufacturing details", "manufacturing specifics" and "manufacturing particulars" are used interchangeably, to relate to the minutiae which may affect the integrity or efficiency of the final product. These typically include the particulars of the raw materials, storage and manufacturing conditions. These manufacturing details are stored electronically as the items which form the searchable digital twin and digital thread for the final product. Non-limiting examples of manufacturing details include: material-specific details ("batch of one") or material batch details, personnel and equipment used, temperature, humidity or pressure recorded during storage, transport or manufacture; expiry date and exposure time tracked of raw materials; specifics of raw materials; and the manufacturing procedure used.

In the present invention, the terms "manufacturing run" refers to production of a single batch or unit ("batch of one") of product, made during a predefined time period.

In the present invention, the term "input data" in reference to a planned job run of a production floor, refers to details of a product required to be made. These details may include the following non-limiting examples: orders, quantities and due dates from ERP; design files received from a PLM system, and any restrictions which may exist for a production-plan, the bill of material (BOM) (including specifics of the raw materials, sub-assemblies, parts and their quantities to manufacture an end product). The PLM or MES (Manufacturing Execution System) may additionally input the bill of process (BOP), which includes a list of processes to be executed to manufacture the desired end product. In addition, the "Input data" includes the data collected on the production floor by the sensors tagged to the various assets, and any other input from the production floor staff.

In the present invention, the term "key assets", used in reference to tagged and tracked items, refers to articles and personnel deemed central to the operation of a production floor. Non-limiting examples include: materials or components central to a produced article; time-sensitive and temperature-sensitive materials, such as composite materials based on carbon fiber reinforced polymers (CFRP), utilized for instance in the aircraft industry. Additional assets which may be may be tagged and tracked, are key tools, assemblies, Work in Process Inventory (WIP) and key personnel.

Tagging may be performed using any of the following non-limiting exemplar tags: a passive RFID tag, an active RFID tag, a Bluetooth™, or Bluetooth™ Low Energy tag, near field communication, ZigBee protocol, and a barcode. The tracking reader is appropriate to the tag utilized. The tag may optionally comprise a temperature, humidity or pressure sensor for tracking materials sensitive to the environment In the present invention, the term "production site" and "production facility" refers to an area including a manufacturing floor.

The invention thus provides a computer-implemented method for tracking production in a production facility and for obtaining searchable production records, the method comprising, providing a production site with communication access to a central server configured to:

receive status and location data pertaining to tagged central key assets of the production facility, from tracking readers located in the production facility;

record the status and location data in a searchable database of digital threads; wherein the digital threads describe time-related status and information particulars related to production of a manufactured product;

allow execution of a search to detect the particulars of the digital threads.

In some cases, the executable search allows detection of one or more of the following: any products manufactured using a specific subcomponent; any products manufactured in a specific batch; any product made using a specific identified batch of raw material; products including a raw material; products made on specific dates; products made using specific tools; products made by a specific employee;

products made at specific environmental conditions; products made at a specific production facility; products made during a specific time period; and products shipped on a specific date.

Further, in some embodiments the executable search allows execution of a backward genealogy trace, to identify components used in manufacture, when an end product is deemed faulty due to faulty components.

Moreover, the executable search may allow a forward genealogy trace, to identify the location of unused faulty components, and to locate any products made with the faulty components.

Optionally, the executable search allows searching across multiple production facilitates within the same production or supply chain.

Still further, in some embodiments the digital threads are automatically generated during manufacture, and the manufacturing particulars are saved automatically to a database without the need for human data entry.

In some instances, a plurality of the digital threads pertaining to a complex product are digitally classified as a single digital twin for the product.

Additionally, the digital thread, which comprises the manufacturing particulars of a subcomponent, or comprising the manufacturing particulars of a raw material, may be saved in the digital twin of all products made from the subcomponent or made from the raw material.

In some instances, the central key assets are tagged using one of the following: a passive RFID tag, an active RFID tag, a Bluetooth™ tag, a Bluetooth™ Low Energy tag, near field communication, ZigBee protocol, and a barcode tag.

In some embodiments, the digital thread comprises time-related particulars which track at least one of the following members, through a production facility: a predetermined item of raw material; a predefined tool; an employee; and inventory.

Moreover, in some instances the digital thread comprises one of the following particulars: the exposure time left for a time-sensitive material; the environmental conditions measured during a predefined period for an environmental-sensitive material; and the expiration date of a material. In such case, optionally, the material comprises one of the following: a carbon fiber reinforced polymer material; a resin; a metal powder material; a biological material in a pharmaceutical product; a time sensitive material; and temperature sensitive material.

Additionally, the digital thread may comprise one of the following particulars: the history of a key asset and the relationship of a key asset with other key assets.

Preferably, the tracking readers communicate periodically with the server and the database of digital threads is essentially updated in real-time.

Further, the database of digital threads may comprise time-related particulars of a specific production run describing its actual execution at a production site.

Still further, in the searchable database of digital threads, the digital threads of subcomponents manufactured, are defined as linked to the digital threads of the components formed by the subcomponents.

The invention also provides a computerized system for tracking production in a production facility and for obtaining searchable production records, the system comprising:
 an input interface configured to receive status and location data pertaining to tagged central key assets of the production facility, from tracking readers located in the production facility;
 a processing unit operatively connected to the input interface;
 a storage unit operatively connected to the processing unit to store the input data; the storage unit also containing instructions that when executed by the processing unit cause the processing unit to:
  record the status and location data in a searchable database of digital threads; wherein the digital threads describe time-related status and information particulars related to production of a manufactured product;
  allow execution of a search to detect the particulars of the digital threads.

The invention also provides a non-transitory machine readable storage medium containing instructions associated with tracking production in a production facility and obtaining searchable production records; the instructions when executed cause the processor to execute the following:
 receive status and location data pertaining to tagged central key assets of a production floor, from tracking readers located in the production site;
 record the status and location data in a searchable database of digital threads; wherein the digital threads describe time-related status and information particulars related to production of a manufactured product;
 allow execution of a search to detect the particulars of the digital threads.

BRIEF DESCRIPTION OF THE DRAWINGS

The present invention is illustrated by way of example in the figures of the accompanying drawings, in which like references indicate similar elements and in which:

FIG. 3 shows additional particulars of a digital thread for a specific unit of material, including time spent in various locations and conditions.

DETAILED DESCRIPTION OF THE INVENTION

Figure 1:
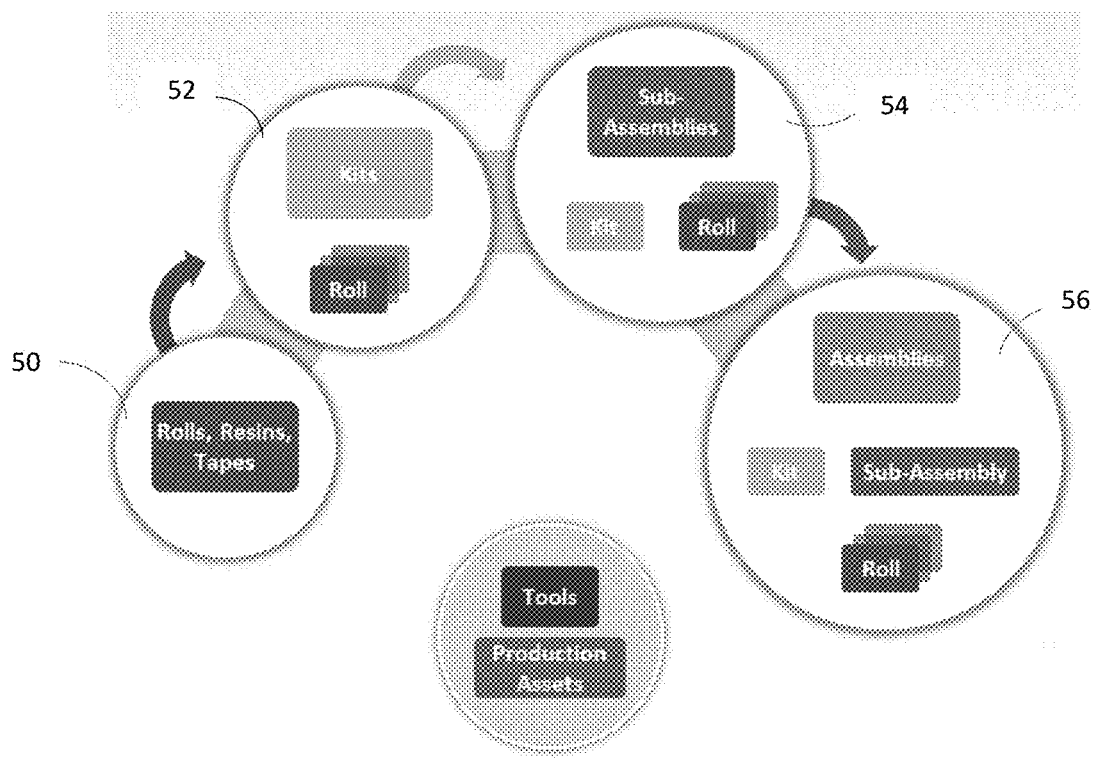
FIG. 1 illustrates schematically the manufacture of an assembly, built of various raw materials that fabricate kit and parts, ultimately assembled into the final assembly. The raw materials are tagged and tracked from storage to production.

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In a general overview, the software of the invention generates "digital twins" and "digital threads", which are electronic searchable records detailing the product manufactured and manufacturing details of each product manufactured. All manufacturing details are recorded, which may affect the integrity or efficiency of the final product. The digital thread is saved in a database and is electronically searchable, so that in case of a future recall or need for diagnostic retrieval of information, a search will rapidly identify any of the following examples: any products manufactured in a specific batch; products which included a specific predefined ingredient or raw material; products made on specific dates; products made using specific tools; products made by a specific employee; products made at specific manufacturing conditions such as temperatures, humidity, exposure time; products made at a specific manufacturing facility; products shipped on a specific date, etc.

When an inferiority is detected during quality control checks or at any other time, the digital thread database may be searched to rapidly identify the individual products that need to be reexamined or corrected. Examples of such products could be those which used a specific damaged raw material, those made using a specific tool deemed later to be defective, etc. Thus, the software of the invention ensures that the number of items to be corrected is highly limited, preventing harmful publicity, and limiting the economic damage of the cost of poor quality product and the resultant rework.

In a preferred embodiment, the digital thread is automatically generated during manufacture, with the manufacturing specifics entered automatically to a database without the need for human data entry. Rather, data is collected and forwarded to the database, from tagged key production assets in communication with tracking readers, each of which may include sensors; and which are located in the production area. Thus, central ingredients or machinery may be tagged for instance with RFID or Bluetooth™ tags, which communicate with RFID or Bluetooth™ trackers placed in the production floor. The RFID or Bluetooth™ tags may include temperature sensors, and will report location and the measured temperature periodically to the trackers, and the data will be forwarded to a central database as a digital threads detailing the production specifics for that production run.

Referring now to FIG. 1, the final complex products which are manufactured on a production floor, inherit information from their 'parent' subcomponents or 'parent' raw materials.

FIG. 1 illustrates manufacture of an Assembly which forms part of the structural body of an airplane. The initial raw materials "Rolls, Resins and Tapes" 50, are tagged and tracked from storage to production. These are used to manufacture "Kits and Rolls" 52, which are then made into "Sub-assemblies, larger Kits and Rolls" 54, before forming the final product made at the facility, "Assemblies" 56.

Several raw materials or rolls may be used for the final product.

A digital record is created and saved as an electronically searchable digital thread, which includes all aspects of the production details, and materials used. The particulars of the digital thread are enlarged hereinbelow.

The digital thread includes the "genealogy" of the raw materials and subcomponents, and allows tracing of multiple generations: when a part is generated from more than one material, the particulars derived from the parent materials are stored and included in the record of the "child" component. Then, if two such child components are used to build a bigger assembly, that assembly is viewed as the grandchild, and its digital thread records will include the manufacturing and ingredient specifics of its ancestors. Such tracking through multiple generations of manufacture is termed generation of a 'Digital Thread', and may be searched through 'Digital Twins' (the virtual electronic records of each physical product).

The digital threads and digital twins generated and recorded, are searchable up/down an infinite number of levels (generations), and can be searched sideways as much as needed (i.e. an infinite number of parent components making or affecting one 'child'). The digital twins can also be tracked and searched across multiple production facilitates that operate on or within the same production or supply chain. The digital threads from each production facility in the supply chain can be linked into one or more long digital threads.

Thus many digital threads may be interconnected, to form a "web" of threads. A single material may generate multiple kits, and a single tool may be used to create multiple kits. Two sets of threads may intertwine when a given kit is created from material A and Tool T.

The software of the invention stores the thread, and creates both a parent-child link, and also associates the child with the entire history of the parent, before and after the child was born.

Prior art MES (manufacturing execution systems) are process and work-order oriented. Prior art MES do not track material-specific or product oriented digital twins and threads, and do not record the environmental properties (e.g. temperature, humidity, etc.), in which products were created. They are also not infinitely scalable to hold product genealogy information.

Figure 2:
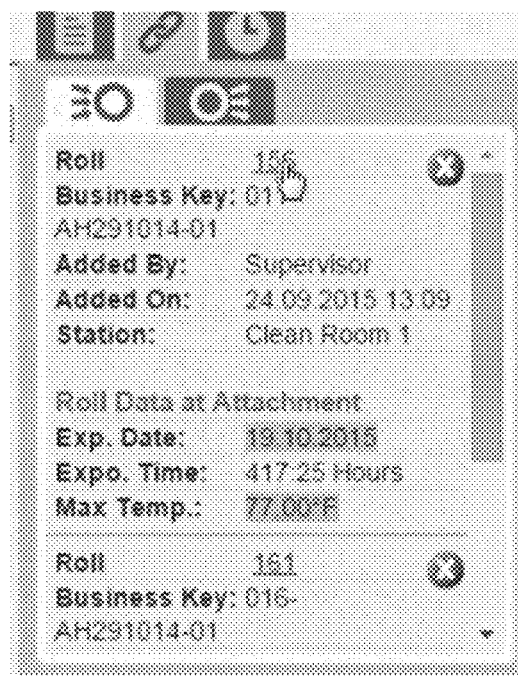
FIG. 2 illustrates the manufacturing particulars which make up part of the digital thread, for a particular roll of material.

Referring to FIG. 2, the manufacturing particulars for a particular roll of material, identified as "roll 156", are illustrated. The roll has been entered into inventory by the Supervisor, on Sep. 24, 2015, and stored in the Clean Room. The Expiry Date is noted as 19.10.2015, with a maximal allowable exposure time of 417.25 hours. The maximum allowable temp. is 77 deg. F.

These manufacturing details are part of the digital thread recorded for any products which utilize this roll of material. If additional rolls of material are used, their specifics are added to the digital thread for the final product.

Figure 3:
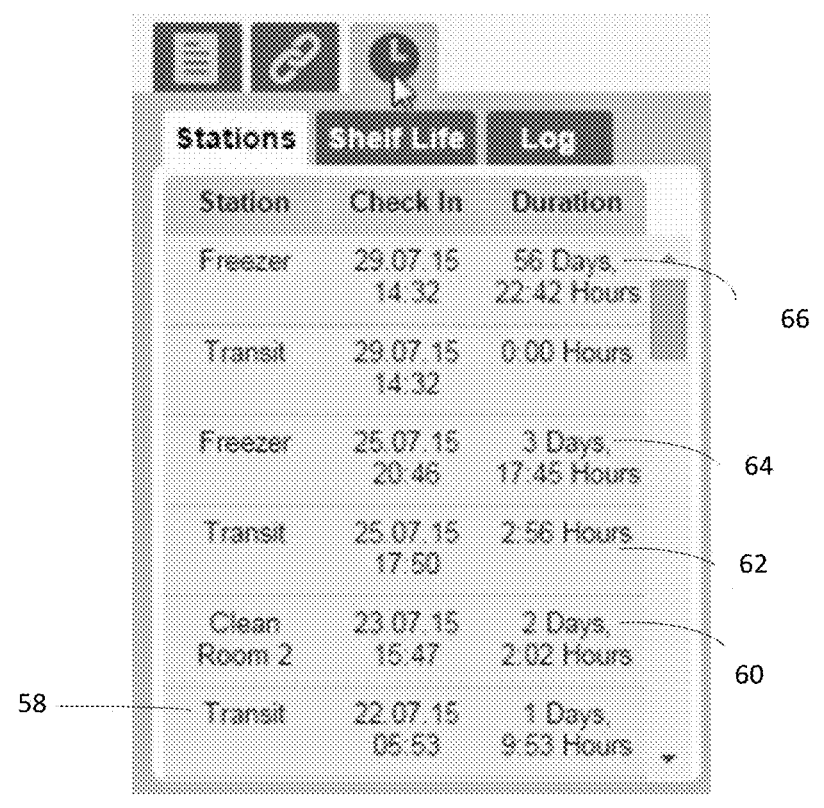

Referring now to FIG. 3, Roll 156 is tagged with an RFID tag upon its entry to the manufacturing facility, and automatically tracked using RFID readers placed throughout the production facility. Active RFID tags may be used which include temperature and humidity sensors, or these sensors may be attached separately to Roll 156. Data which is measured by these sensors is communicated to a central database for inclusion in the digital thread for the particular roll. For instance, the location and exposure time for "Roll 156" is shown in FIG. 3: the Roll was initially in Transit 58 for 1 day. The roll was placed in the Clean Room on 23.7.15 for 2 days 60, then in Transit for 2:56 hours 62. The roll was stored in the Freezer for 3 days 64, then transported to an adjacent Freezer on 29.7.16 for 56 days 66. All data shown in FIG. 3 becomes part of the digital twin for this roll, is saved in a central database and is searchable at any time.

As the digital thread includes comprehensive manufacturing data which originates from all raw materials, and continues tracking the manufacture until the final product is deployed to the end user, the digital thread is said to be a "cradle to grave" report on the manufactured product.

Figure 4:
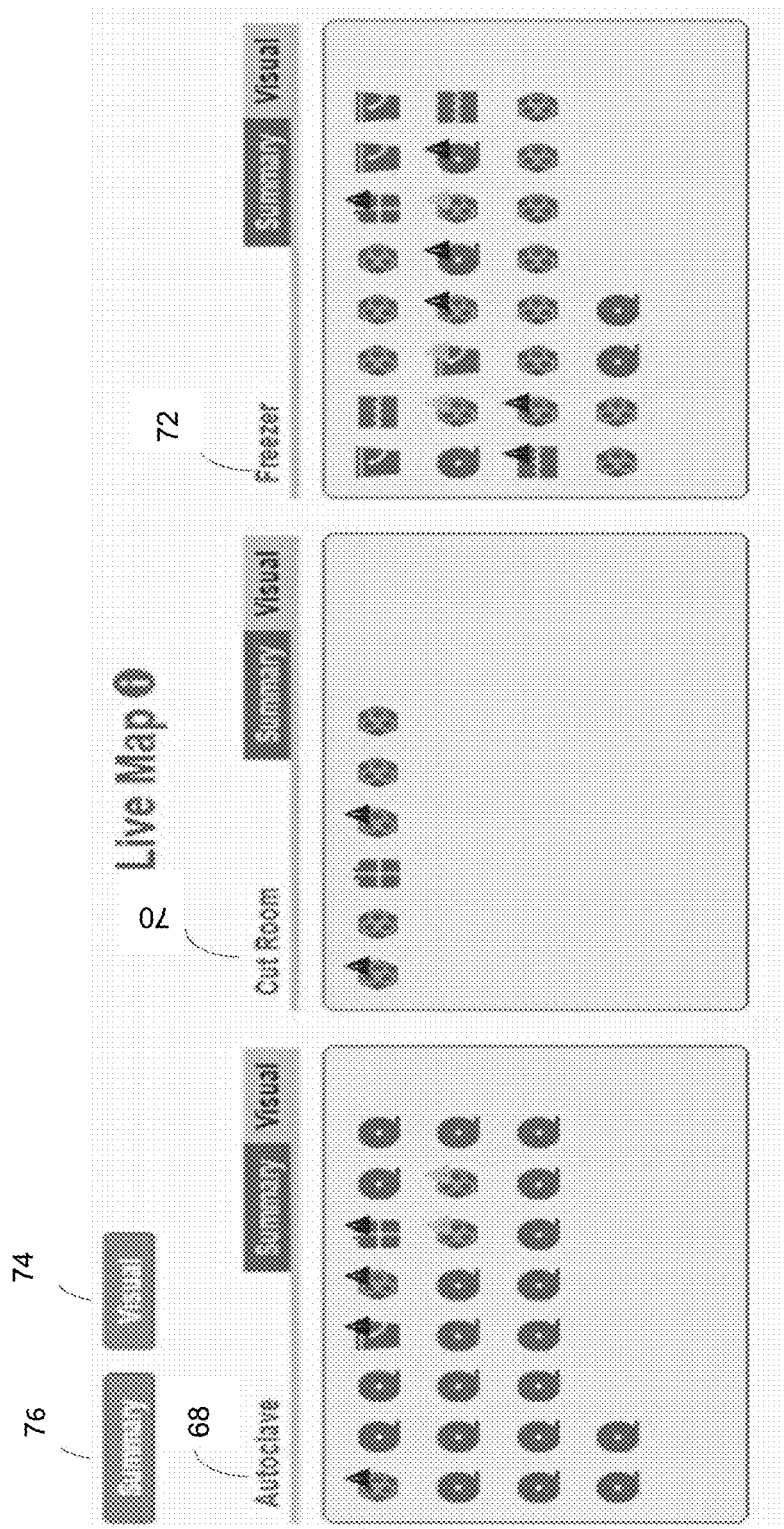
FIG. 4 depicts a visual Live Map of all tagged key assets located in the production facility, illustrating the tracking and traceability of all assets in the digital twin database of a production facility.

Referring to FIG. 4, a Live Map is illustrated for all tagged key assets located in the production facility. In the Visual depiction 74, each asset is shown as an icon, which may be clicked on to view details related to the asset, and which make up its digital twin. The Live Map is split into screens relating to assets located in the Autoclave 68, assets located in the Cut Room 70 and assets located in the Freezer 72. A user may click on the Summary button 76 to view the assets in a detailed list view.

Assets related to manufacturing, may thus be tracked in real time, to give a complete picture instantaneously at any time.

The digital twin includes a digital record of any physical asset, including the asset's history, time-sensitive data (exposure time left and expiration date), status, location, and the relationship of the asset with other assets.

Key assets which may be tagged and tracked, are articles and personnel deemed central to the operation of the production floor. Non-limiting examples include: materials or components central to a produced article; time-sensitive and temperature-sensitive materials, such as composite materials based on carbon fiber reinforced polymers (CFRP), utilized for instance in the aircraft industry. Additional assets which may be may be tagged and tracked, are key tools, assemblies, Work in Process Inventory (WIP) and key personnel.

Key assets may be tagged using one or more of: a passive RFID tag, an active RFID tag, a Bluetooth™ tag, near field communication, and a barcode. The tag may comprise a temperature, humidity or pressure sensor for tracking materials sensitive to the environment.

The tracking reader should be appropriate to the tag utilized, so that the transmitter and receiver should share a mutual communication protocol.

In a preferred embodiment, the tracking reader communicates periodically and automatically with a server running the software of the invention, so that the data which forms the digital twin and digital thread, is updated and saved to a central database automatically, without the need for data entry personnel. The digital twin is thus a real-time status, and third-party typing errors and delays are avoided.

Figure 5:
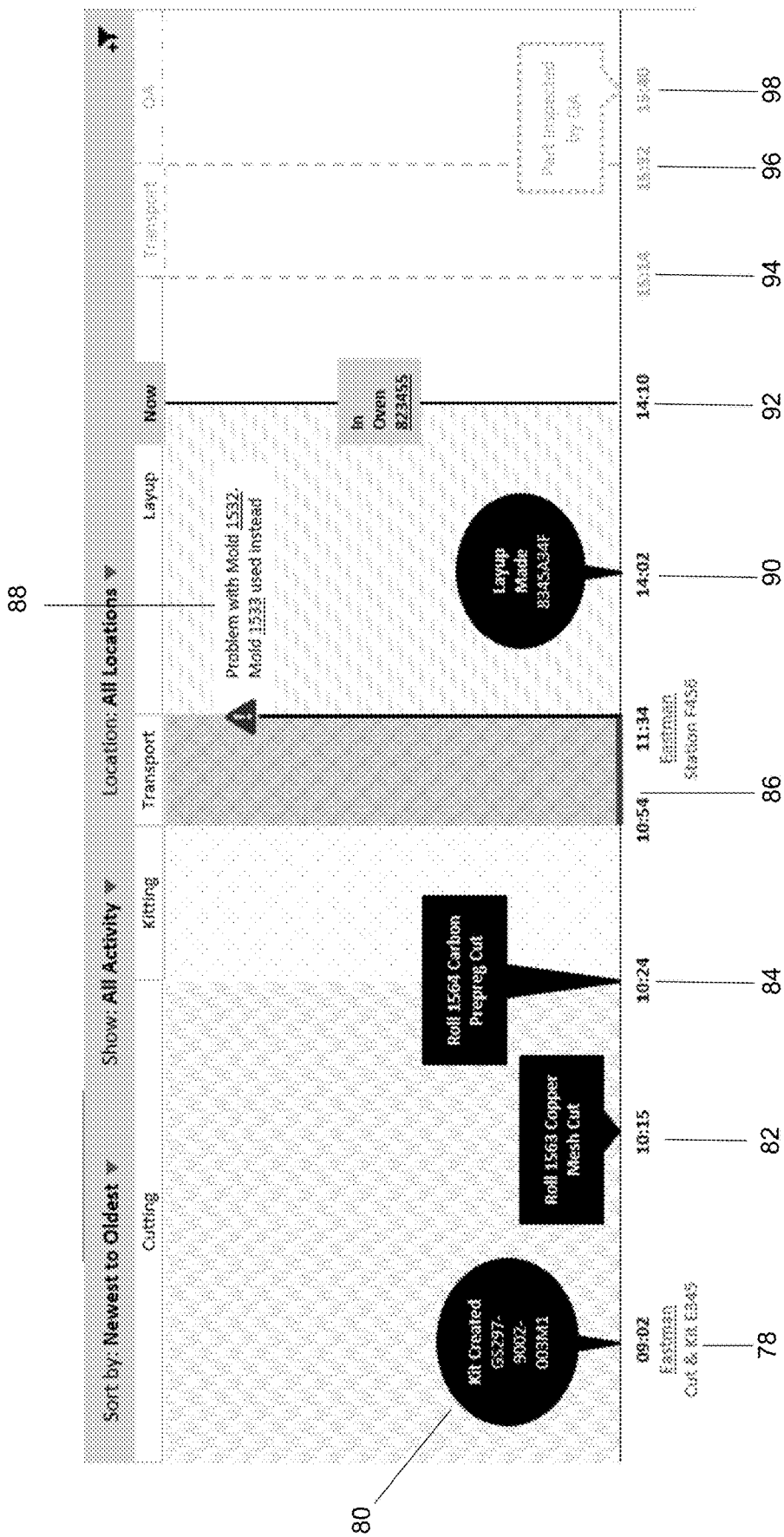
FIG. 5 depicts a digital thread shown as a visual manufacturing timeline, in which manufacture of a single product is tracked.

Referring to FIG. 5, a Digital Thread is shown as a visual manufacturing timeline, in which manufacture of a single product is tracked. On a specific recorded date, in a particular facility manufacturing airplane components, at 9:02 am an Eastman Cut & Kit E345 78 was utilized to create a smaller Kit now labeled GS297-9002 80. At 10:15 am 82, Roll 1563 of Copper Mesh was cut. At 10:24 am 84, Roll 1564 was cut. These three items were transported from 10:54 to 11:34 am 86 to Eastman Station F456, when a problem was noted 88 with a mold 1532 which was intended for use. Replacement mold 1533 was used instead, and this was electronically recorded in the digital twin record saved in the database. At 14:02 pm 90 a layup was made and labeled serial number 8345A34F. At 14:10 pm 92 the layup was placed in Oven No. 823455, and removed at 15:14 pm 94. The product was transported till 15:32 96, then inspected by Quality Assurance at 15:40 pm 98.

The details recorded in the visual timeline of FIG. 5, are referred to as the manufacturing details, which make up the digital thread. The digital thread additionally includes (not shown in the figure): specifics of all raw materials (manufacturer catalog number and batch detail), humidity and temperature at all stations, specific identification number of all tools used, personnel on shift at all stations, identification of manufacturing facility, exposure times and expiry dates for all raw materials used, and the respective threads of all assets that were part of the creation of the abovementioned thread, before, during and after its creation.

Figure 6:
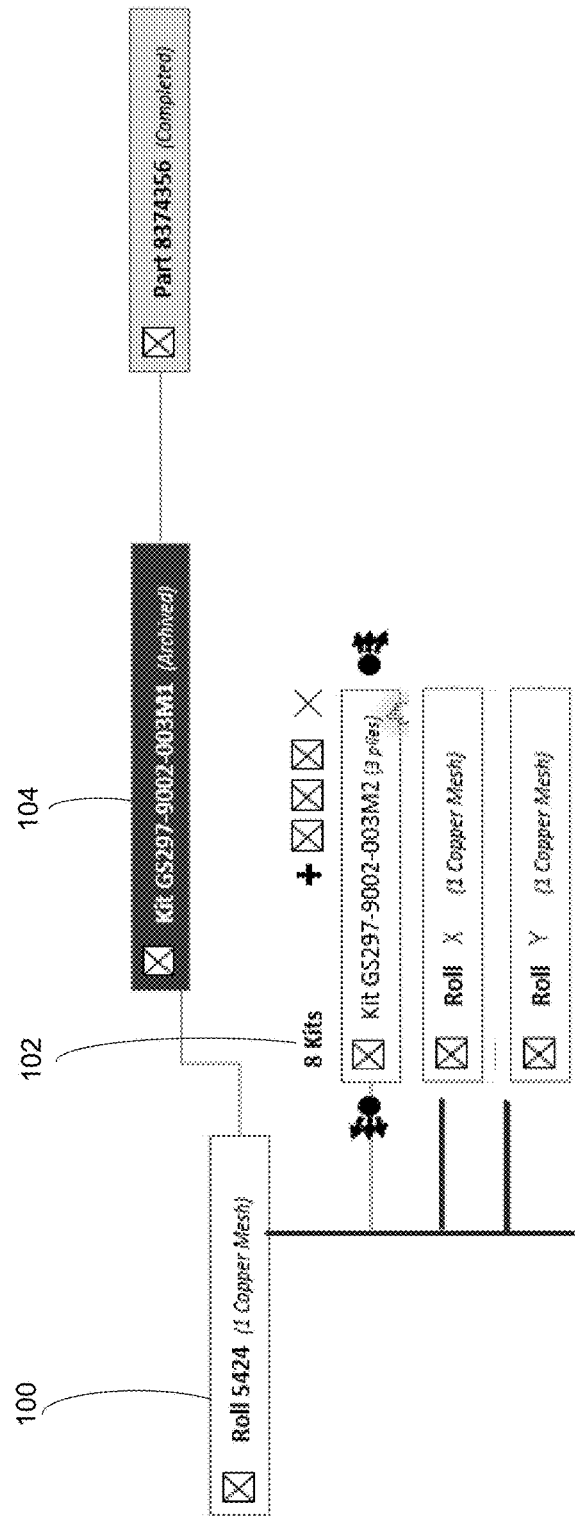
FIG. 6 illustrates a traceability search performed to identify all products made from a specific component roll of copper mesh.

Referring to FIG. 6, a traceability search was performed to identify all products made from component Roll 5424 100 of Copper Mesh. It was determined that 8 kits 102 were made from this roll, and labeled Kits G297-9002003M1. Of these, only one kit 104 was used to manufacture the product Part 8374356 106, while the remaining 7 kits are still stored in the freezer.

Thus, the genealogy may be traced both forward and backward: Should the end product be deemed faulty, and the original materials or subcomponents were deemed to be at fault, a backward trace may be done to readily identify the materials used in manufacture of the end product. All unused components may be discarded.

Alternatively, if a raw material needs to be discarded, a search may be made to identify the location of unused raw material and any products made with this material (a forward trace).

Figure 7:
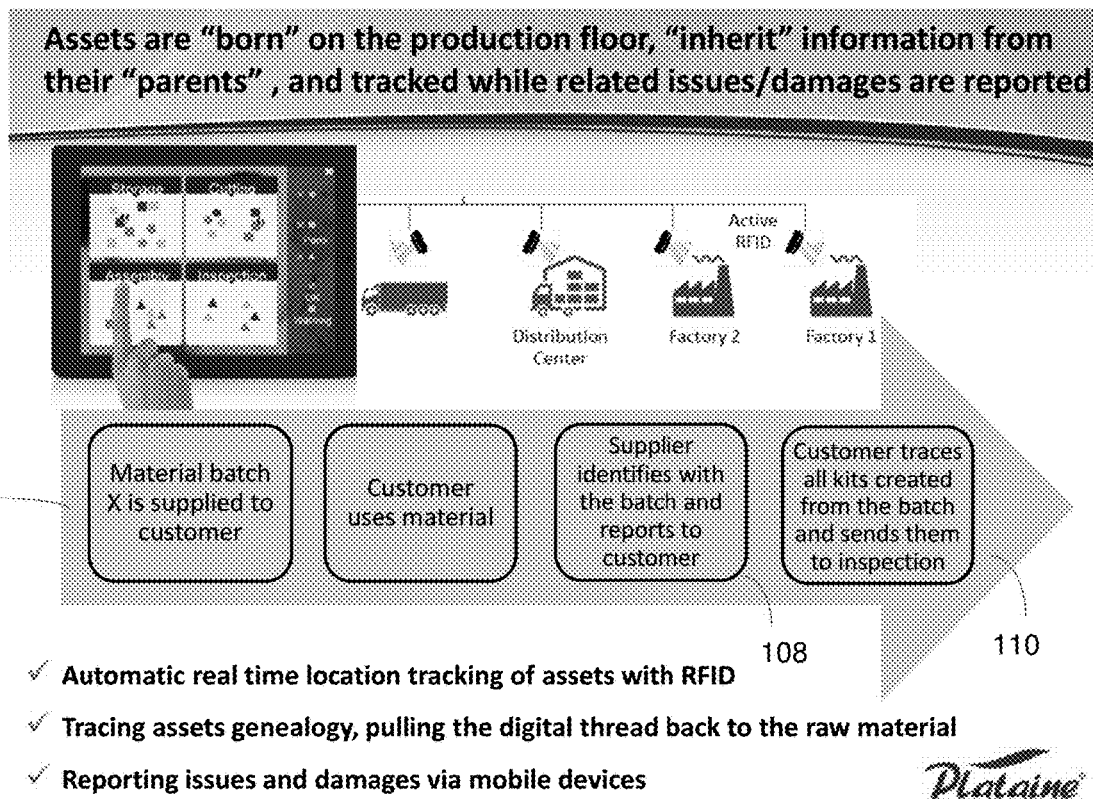
FIG. 7 illustrates searching a digital thread to identify products made from a specific faulty batch of material, even after the product has been deployed to a remote end user.

Referring to FIG. 7, in case of a recall, the digital thread records may be searched to identify all products made from a specific faulty batch of material 106, even after the product has been deployed down the supply chain to a remote end user. The digital thread may be identified and the end customer notified 108. As only a readily identified batch was tainted, the extent of the recall is limited to only a few items 110, which has little financial impact on the manufacturer of the faulty material.

The following searches of the database of digital threads, may be performed:

1. "Find me" for all products made from an expired or otherwise defective material.
2. "Find me" for all components made on a defective tool.
3. "Find me" for a tool that created Part X (later proven defective), then "find me" for all parts made by this tool.
4. "Find me" for the materials that were used to create Part X (defective), followed by "find me" for all parts made of these materials.
5. "Find me" for all parts made between 2 and 4 pm on August $3^{rd}$, during which excessive humidity was measured in the factory. Schedule a check of these parts.
6. Trace recycled material to see what it was used for before it was recycled.
7. "Find me" for all components made by a specific (ill-trained) operator.
8. "Find me" for all components made using a specific machine or at a specific location
9. Any combination thereof, e.g. "Find me" all the components that were made on a given Tool T, by a given Operator O, with a given Material M, at given Time Window W over a threshold Temperature C.

The 'digital thread' weaves a single integrated stream of digital data that makes information from the entire life cycle available and visible to all stakeholders. This would include—among other information—asset location (including pre-preg composite rolls, kits and assemblies), assets' status and availability (including tools, machines, autoclaves and personnel), exposure time information of parts, kits and assemblies, as well as full genealogical information for each asset or resource, from the moment it was first created, throughout production and beyond into MRO (maintenance, repair, and overhaul). The digital thread model is enabled by the Internet of Things (IoT) abilities and supports full traceability of each part, starting at the raw material phase and through fabrication on the production floor, for later stage auditability and significantly shorter crisis management should a defect occurred or be discovered along the way.

The greater digital context provided by the digital threads of the software of the invention, enables better decision making, while reducing risk and pushing the productivity envelope. Weaving the digital thread is crucial for reducing rework and scrap, and enhances the quality and the quality control, to ensure compliance with strict standards or regulations and on-time delivery.

EXAMPLES

Example 1

Damaged Raw Material Simulation

For illustration purposes, a simulated defect was "identified" in 2 pre-preg composite raw material rolls located in the freezer. It was known that some plies were already cut out of these rolls, and were currently used for the assembly on the production floor as WIP (Work In Progress) parts. Other products were already completed and assembled then cured, and were awaiting packaging. An unknown amount of parts were already packed and were ready to be shipped the next day.

Using the software of the invention to search the digital twin database, all kits and assemblies created from the reported defective raw material are identified in minutes. The full digital thread may be identified from the database, which allows access to the full record of parent materials and 'child' kits and parts. Once these are identified, their location is found immediately based on RFID-tagged reporting. Once found, all relevant kits and parts are inspected for quality and production decisions are made accordingly. Parts already shipped to customers are identified as well, and customers are notified.

In contrast, in prior art, the production floor staff is responsible to check which parts are now being cut using the defective rolls. This information is found in paper files. At the same time the staff needs to locate, track and recall parts that were already cut, kitted, assembled or cured of the damaged rolls. They must physically go to each and every station on the floor (i.e. raw material reception area, freezers, thawing areas, cutting machines, kitting areas, tools and molds stations, autoclaves and packaging sections) and check each material asset, bagged kit and finished product for documentary record of the rolls it was fabricated from. It typically would take several hours for the floor staff to trace down and collect all future parts as well as already-produced parts affected by the 2 damaged rolls. During that time the production line is slowed, causing bottlenecks and jeopardizing delivery of products that were ready for shipment, while the ETL (Expiration Time Left) countdown continues to be a risk for all WIP material left outside of the freezer. During that time, additional parts or assemblies continue to be made using the same defective material Example 2

Damaged Tool and Effect on Tool's Availability

A layup tool was simulated to be faulty, having an uneven scratched surface. This tool was a mold for a specific component, one of three identical molds.

All kits and assemblies created using the 'defective' tool, are identified in minutes by querying the digital thread database and the full web of digital threads it stores. The full records may be retrieved showing which manufacturing details and conditions, including which parts were laid-up on which tool. Once relevant kits and assemblies are identified, their location is found immediately based on their RFID-tags. Once found, all relevant kits and parts are inspected for quality; production decisions are made accordingly. Parts already shipped to customers are identified as well, and customers are notified.

In contrast, in prior art, once a tool is declared defected the production line must be re-planned; Parts that were kitted and bagged awaiting their next station—the layup phase—must be immediately diverted to the other remaining undamaged tools. This step leads to a potential bottleneck, as jobs were already scheduled for 3 tools. The cutting machine operators can't cut new parts designated for this tool and need to take raw material back to the freezer to stop the shelf life count down. Each individual kit on the production line needs to be inspected for ETL and prioritized: either back to the freezer, or, if it has a longer ETL, wait for layup. All these crisis management phases are labor intensive as travel documents are attached to the kitted bags thus shelf life and ETL data is only accessible via visual inspection.

The defective tool is taken out of the clean room for inspection. After inspection, a decision will be made whether the defect is repairable or whether a new mold should be ordered from the provider.

The production line manager needs to trace the parts that were already produced on the defective tool. Here too, time is of the essence as the shelf life clock is ticking. Some parts were waiting kitting while others were on their way to the autoclave. Other parts to be inspected were already past the autoclave phase. Staff members must go over all the parts past the layup station; the parts awaiting assembly, parts assembled and parts already cured and completed, awaiting packaging needs to be physically and individually inspected by their travel document, to see whether or not they were in fact produced on the damaged tool.

Once the labor-intensive inspection for all parts is completed, and parts planned to be molded on the damaged tool were diverted and scheduled for the 2 other identical tools, a new schedule for producing this component batch was prepared, further pushing the delivery, and creating secondary delays for future parts previously scheduled to be produced on that production line.

Example 3

Kit Recut

This event simulated the immediate need to locate pre-preg composite rolls for re-cut of a specific kit, after it was found to be under-cut in quantity. In the example, the kit was already waiting for curing and due to shelf-life reasons, time was of the essence. All kits of the same type need to be located and held back until the missing kit is remade so they could be cured together.

Using the software of the invention, a search is done on the database of digital threads, and the material used to make the unusable part is identified and located. If there is sufficient material to cut, the same roll is used. If not, other rolls of the same batch are automatically identified and used. If the required batch is consumed as well, the software triggers a new production order for a complete new part.

In contrast, in the prior art, each raw material roll and WIP (Work-in-Process) kit is tracked manually by its accompanying travel document. When the need to locate a specific kit or roll arises, staff need to physically search the kit at all stations or search the roll inside the freezer to find a roll that would fit the need in terms of ETL, batch (lot) number and dimensions. The staff need to check the undercut kit's travel document to see which rolls it is made of as it is preferable to make the re-cut out of the exact same rolls (or at least batch) the original kits were cut from. This task involves a long and labor intensive procedure as it requires searching physical documentation. Locating the desired roll in one of the freezers involves trial and error, since the description of each roll (i.e. ETL and dimensions) is physically attached to the roll itself.

Example 4

Freezer Malfunction and its Shelf-Life Impacts

A malfunction of the storage freezer containing pre-preg composite raw material was simulated, during which the freezer was inactive for 2 hours overnight. This resulted in increased storage temperatures and the need to retroactively deduct two hours from the remaining shelf-life of all materials and kits stored in the freezer during that time.

Using the software of the invention, the digital thread database is searched and all materials and kits are identified that were in the freezer during the effected time. The exposure time left (ETL) is re-calculated and reduced by 2 hours automatically. Similarly, any parts already fabricated of these materials or kits are identified and the ETL is identified.

Any materials or kits that have expired are flagged for quality inspection, and any materials or kits that are close to be expired are flagged for urgent completion.

Once identified, all such assets' location is found immediately based on the RFID-tagged reporting, and action is taken accordingly. Parts already shipped to customers are identified as well, and customers are notified.

In contrast, in prior art, the production floor staff physically goes through all paper travelers attached to each raw material, WIP kits and parts as well as finished products. For each such asset, they must identify those that have been in the freezer during that period and might have been affected by the freezer malfunction, as well as any kits created from such materials. For each affected asset, 2 shelf-life hours must be deducted, and ETL (Exposure Time Left) recalculated. Raw material rolls, kits and other WIP that have passed the threshold must be disqualified and potentially scrapped for repeat production. Raw material rolls or WIP that are about to expire must be identified and action taken to use them before they become expired and get written off. Such identification process is labor intensive and prone to errors as it involves physical check of each asset's travel document, individually.

Example 5

Recycling of Carbon Fiber Materials

Carbon fiber material reclaimed from aging aircraft/automobiles are repurposed for composites applications. For example, SGL™ automotive CF scrap can be reused for BMW™ i-series, in stitched nonwoven materials.

Recycling the carbon fiber (RCF) is performed using a pyrolysis processes, which modifies the properties of the material (stiffness, Max allowed temp, tensile modulus and strength).

The reclaiming and pyrolysis process, set limits to the manufacturing processes and limits the final use of the CF material. For example, an aircraft primary structure requires over 5 GPa tensile strength. The new properties of the material are recorded as a result of the pyrolysis processes, in a digital thread which can be searched. A material could go through several reclaiming cycles, all of which would influence the properties of the material.

When choosing the right material for a production job, only materials with the relevant properties should be identified in a search, to avoid the risk of misuse. When a material is slated for use in a manufacturing job it is not suited for, an alert is given and action is taken (replacing the material, scraping, sending the part to be checked in the lab . . . ).

In all the Examples shown, days or weeks of labor are reduced to minutes, while production stoppage and delays are limited or eliminated. Quality is not reduced, it is improved, as there is complete certainty that all affected kits or parts are identified and found, as compared to the manual process of surveying paperwork and physical assets, which continues to run the risk of missing a case or more.

In summary, the invention utilizes the Industrial Internet of Things (IIoT) to leverage automated and optimized decision making by weaving a complete digital thread based on rich digital context. The software aids in backtracking the manufacturing history, in case of a recall or in other operational scenarios. The digital thread constitutes a single integrated stream of digital data relating to all relevant assets on the production floor. This may the location data of raw materials, their exposure time information, the availability of tools, machines, and personnel, as well as the full genealogy information for each, from the moment it was first created on the production floor and until after the finished part is produced.

The improved process stores and analyzes all this information, and optionally sends alerts of critical thresholds to staff as well as action instructions, becoming a fundamental basis for dramatic improvements of production efficiencies.

When a mobile asset leaves the freezer, the time stamp is automatically triggered. Once a kit is created from given raw materials, it inherits the parent-material properties automatically, and once tagged with RFID tag it is automatically tracked on its own. All such mobile assets (raw materials, new kits, WIP and finished good parts) are centrally and automatically tracked. Together with the use of RFID sensors affixed to each asset on the production floor it eliminates the risk for human errors, allows full digitization of the process and new tracking abilities, replacing the paper-based, time consuming, labor intensive and error-prone documentation and tracking methods. Use of the software allows production floor staff to rely on system's alerts every time an asset is about to reach a threshold as well as optimized action recommendations and manufacturing decisions.

If a reduction in shelf-life occurs, or a raw material or tool has found to be damaged, the software automatically and immediately:
  Identifies all potentially affected assets and sends alerts to relevant stakeholders;
  Updates the ETL accordingly, to match the new conditions;

Identifies and alerts of all assets that have reached a threshold and escalates them to the production staff;

Identifies and alerts of all assets that are about to expire but could still be saved and utilized, by taking immediate action such as recommending to production staff to have them remain in the freezer or rush them to curing.

Another embodiment of the present invention is a computerized system for executing the method of the invention.

The computerized system includes a processing unit, a storage unit, an input interface, and an output interface. In this embodiment, these components are part of a personal computer, and they form a computing module. The components instead may be part of a workstation, PDA, or smart phone as non-limiting alternative example embodiments. As a further alternative, a computing module may be part of a machine used on the production floor.

The input interface of the computerized system is configured to receive manufacturing data that include job data, product design data, resource data, and receives and stores data pertaining to the digital thread, in a storage unit having digital memory. The input interface may for example include a USB socket of the personal computer. The input interface may alternatively receive input from an entry device, such as a keyboard, and/or adjacent computer systems, such as Enterprise Resource Planning (ERP), and computer aided design (CAD) software. The computerized system includes an input module that is configured to transmit to the input interface a user's input.

The processing unit is operatively connected to the input interface, the output interface, and the storage unit. The processing unit executes instructions contained in the storage unit. The instructions, when executed, cause the processing unit to: receive status and location data pertaining to tagged central key assets of the production facility, from tracking readers located in said production facility;

record the status and location data in a searchable database of digital threads. The digital threads describe time-related status and information particulars related to production of a manufactured product. The instructions further allow execution of a search to detect the particulars of the digital threads.

As non-limiting examples, the processing unit of system may include an Intel Pentium Processor E5400, an Intel Xeon 5130 CPU, or any other equivalent means for processing (executing) instructions contained in the storage unit. Also, as non-limiting examples, the storage unit 14 may be SATA hard drive, a flash memory SSD, or any other equivalent means for storing instructions that when executed by the processing unit cause the processing unit to function as described above.

The embodiment may be modified to allow a user to interact with a computing module through a network. As non-limiting examples, the network may be a local area network (LAN) within an office environment or alternatively the Internet. An alternative embodiment may implement a "hosted" architecture for the computing module, whereby the algorithmic calculations are done in a remote data-center (server farm) accessible over the network/Internet. Another alternative embodiment may implement a cloud computing configuration for the computing module. Thus, a user may interact with the computing module using a Microsoft® Windows-based utility or a web browser, as non-limiting examples.

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A computer-implemented method for tracking production in a production facility and for obtaining searchable production records of a manufactured product, the method comprising:

providing a production site with communication access to a central server configured to:

a) receive production status and location data, comprising manufacturing details which may affect the integrity or efficiency of a manufactured product; said production status and location data pertaining to tagged central key assets deemed central to operation of a production floor of said production facility; said production status and location data measured during a production run and received from tracking readers located in said production facility;

b) record said production status and location data comprising said manufacturing details which may affect the integrity or efficiency of a manufactured product, in a searchable database of production-related digital threads; wherein said digital threads describe time-related status and information particulars related to production of a manufactured product;

allow execution of a search of said database, to detect the manufacturing details of said production-related digital threads.

2. The method of claim 1, wherein said manufacturing details and said executable search allows detection of one or more of the following: any products manufactured using a specific subcomponent; any products manufactured in a specific batch; any product made using a specific identified batch of raw material; products including a raw material; products made on specific dates; products made using specific tools; products made by a specific employee; products made at specific environmental conditions; products made at a specific production facility; products made during a specific time period; and products shipped on a specific date.

3. The method of claim 1, wherein said executable search allows execution of a backward genealogy trace, to identify components used in manufacture, when an end product is deemed faulty due to faulty components.

4. The method of claim 1, wherein said executable search allows a forward genealogy trace, to identify the location of unused faulty components, and to locate any products made with said faulty components.

5. The method of claim 1, wherein said executable search allows searching across multiple production facilitates within the same production or supply chain.

6. The method of claim 1, wherein said digital threads are automatically generated during manufacture, and said manufacturing particulars are saved automatically to a database without the need for human data entry.

7. The method of claim 1, wherein a plurality of said digital threads pertaining to a complex product are digitally classified as a single digital twin for said product.

8. The method of claim 1, wherein the digital thread, comprising the manufacturing particulars of a subcomponent, or comprising the manufacturing particulars of a raw material, are saved in the digital twin of all products made from said subcomponent or made from said raw material.

9. The method of claim 1, wherein said central key assets are tagged using one of the following: a passive RFID tag, an active RFID tag, a Bluetooth™ tag, a Bluetooth™ Low Energy tag, near field communication, ZigBee protocol, and a barcode tag.

10. The method of claim 1, wherein said digital thread comprises time-related manufacturing details which track at least one of the following members, through a production facility: a predetermined item of raw material; a predefined tool; an employee; and inventory.

11. The method of claim 1, wherein said digital thread comprises one of the following manufacturing details: the exposure time left for a time-sensitive material; the environmental conditions measured during a predefined period for an environmental-sensitive material; and the expiration date of a material.

12. The method of claim 11, wherein said material comprises one of the following: a carbon fiber reinforced polymer material; a resin; a metal powder material; a biological material in a pharmaceutical product; a time sensitive material; and temperature sensitive material.

13. The method of claim 1, wherein said digital thread comprises one of the following manufacturing details: the history of a key asset and the relationship of a key asset with other key assets.

14. The method of claim 1, wherein said tracking readers communicate periodically with said server and said database of digital threads is essentially updated in real-time.

15. The method of claim 1, wherein said database of digital threads comprises time-related manufacturing details of a specific production run describing its actual execution at a production site.

16. The method of claim 1, wherein in said searchable database of digital threads, the digital threads of subcomponents manufactured, are defined as linked to the digital threads of the components formed by the subcomponents.

17. The method of claim 1, wherein said manufacturing details which may affect the integrity or efficiency of a manufactured product comprise one or more of the following: a specific subcomponent used; batch specifics of products manufactured in a specific batch; any product made using a specific identified batch of raw material; the specifics of raw materials used in a product; the expiry date of a raw material; manufacturing dates of a product; specific tools used in manufacture of a product; specific employees that manufactured a product; specific environmental conditions during storage and/or during manufacture; specific production facility identity in which production occurred; specific time period of production; the shipping date and identity of products shipped; the exposure time of a raw material; and the manufacturing procedure used.

18. The method of claim 17, wherein said specific environmental conditions, comprise one or more of the following: the temperature; the humidity; and the pressure.

19. A computerized system for tracking production in a production facility and for obtaining searchable production records of a manufactured product, said system comprising:

at least one central computer server, in communication with a productions site; said central server comprising:
a) an input interface configured to receive from a production site: production status and location data, comprising manufacturing details which may affect the integrity or efficiency of a manufactured product; said production status and location data pertaining to tagged central key assets deemed central to operation of a production floor of said production facility, said production status and location data being measured during a production run and received from tracking readers located in said production facility;
b) a processing unit operatively connected to the input interface;
c) a storage unit operatively connected to the processing unit to store the input data; the storage unit also containing instructions that when executed by the processing unit cause the processing unit to:
record said production status and location data comprising said manufacturing details which may affect the integrity or efficiency of a manufactured product, in a searchable database of production-related digital threads; wherein said digital threads describe time-related status and information particulars related to production of a manufactured product;
allow execution of a search of said database to detect the manufacturing details of said production-related digital threads.

20. A non-transitory machine readable storage medium containing instructions associated with tracking production in a production facility and obtaining searchable production records of a manufactured product; the instructions when executed cause a processor of a central server in communication with said production facility, to execute the following:
receive production status and location data comprising manufacturing details which may affect the integrity or efficiency of a manufactured product; said production status and location data pertaining to tagged central key assets deemed central to operation of a production floor of said production facility; said production status and location data measured during a production run and received from tracking readers located in said production site;
record said production status and location data comprising said manufacturing details which may affect the integrity or efficiency of a manufactured product, in a searchable database of production-related digital threads; said database stored upon said central server; wherein said digital threads describe time-related status and information particulars related to production of a manufactured product;
allow execution of a search of said database to detect the manufacturing details of said production-related digital threads.

* * * * *